(12) United States Patent
Devassykutty et al.

(10) Patent No.: US 8,505,055 B2
(45) Date of Patent: Aug. 6, 2013

(54) ENHANCED SIMULTANEOUS RECORDING IN MULTI-ROOM DIGITAL VIDEO RECORDER

(75) Inventors: Benny Devassykutty, Irving, TX (US); Enrique Ruiz Velasco, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 365 days.

(21) Appl. No.: 12/482,992

(22) Filed: Jun. 11, 2009

(65) Prior Publication Data

US 2010/0319038 A1 Dec. 16, 2010

(51) Int. Cl.
*H04N 7/18* (2006.01)
*H04N 7/16* (2006.01)
*H04N 7/173* (2006.01)
*H04N 5/76* (2006.01)

(52) U.S. Cl.
USPC ............ 725/78; 725/85; 725/133; 725/139; 725/141; 725/153; 386/235

(58) Field of Classification Search
USPC .............. 725/46, 74, 78, 85, 133, 139, 141, 725/153; 386/235–238, 292
See application file for complete search history.

(56) References Cited

U.S. PATENT DOCUMENTS

| | | | | |
|---|---|---|---|---|
| 6,804,824 | B1 * | 10/2004 | Potrebic et al. | 725/38 |
| 7,917,008 | B1 * | 3/2011 | Lee et al. | 386/291 |
| 7,954,131 | B2 * | 5/2011 | Cholas et al. | 725/112 |
| 8,229,283 | B2 * | 7/2012 | Ellis | 386/296 |
| 2003/0163823 | A1 * | 8/2003 | Logan et al. | 725/89 |
| 2005/0102698 | A1 * | 5/2005 | Bumgardner et al. | 725/80 |
| 2005/0120386 | A1 * | 6/2005 | Stone | 725/134 |
| 2005/0138659 | A1 * | 6/2005 | Boccon-Gibod et al. | 725/58 |
| 2006/0242325 | A1 * | 10/2006 | Ramaswamy et al. | 709/246 |
| 2007/0204311 | A1 * | 8/2007 | Hasek et al. | 725/91 |
| 2008/0022332 | A1 * | 1/2008 | Barrett | 725/89 |
| 2008/0166103 | A1 * | 7/2008 | Tajime | 386/94 |
| 2008/0184327 | A1 * | 7/2008 | Ellis et al. | 725/134 |
| 2008/0216135 | A1 * | 9/2008 | Pfeffer et al. | 725/93 |
| 2008/0282312 | A1 * | 11/2008 | Blinnikka | 725/153 |
| 2009/0060450 | A1 * | 3/2009 | Daniels | 386/68 |
| 2009/0199256 | A1 * | 8/2009 | White et al. | 725/131 |
| 2009/0222875 | A1 * | 9/2009 | Cheng et al. | 725/147 |
| 2010/0020794 | A1 * | 1/2010 | Cholas et al. | 370/389 |
| 2012/0151526 | A1 * | 6/2012 | Lemmons et al. | 725/39 |
| 2012/0222072 | A1 * | 8/2012 | Hudspeth | 725/39 |

* cited by examiner

*Primary Examiner* — Pinkal R Chokshi (57) ABSTRACT

A computing device receives from a user, a request to simultaneously record two or more programs from a content server onto the computing device and initiates a streaming video session between the computing device and a video client. The computing device provides, to the video client, recording parameters for one of the programs and then receives, via the streaming video session, a video stream from the video client. The video stream includes the one of the programs from the content server based on the recording parameters that is then recorded by the computing device.

20 Claims, 6 Drawing Sheets

ENHANCED SIMULTANEOUS RECORDING IN MULTI-ROOM DIGITAL VIDEO RECORDER

BACKGROUND

With current set-top box/digital video recorders (STB/DVRs), a consumer is generally limited to a number of tuners available on their STB/DVR. The number of tuners is a limitation on the number of programs that can be recorded at a given time. This may cause consumer frustration because consumers may need to decide which programs they want to record (e.g., tuner conflict is currently a manual process). Furthermore, adding tuners to STB/DVRs is a non-trivial task and is generally very expensive.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may allocate STB/DVR capacity among other terminal video clients (such as another STB) in a home network so that a user may increase a number of programs that may be recorded at a specific time. The systems and/or methods may enable the STB/DVR to use the tuners of other video clients remotely to expand the number of virtual tuners available to the STB/DVR. In implementations described herein, the STB/DVR and the terminal video clients may communicate via an in-home network. The STB/DVR can request that a terminal video client tune to a particular channel and stream content from a content server to the STB/DVR, which can format and store the video stream in memory of the STB/DVR.

"Content," as the term is used herein, is to be broadly construed to include, for example, short form video segments (e.g., music videos, television (TV) programs, video clips, etc.), long form video segments (e.g., movies), music files, games, publications, user-generated content (e.g., home videos, personal videos, on-line video service-based videos, etc.), etc.

Figure 1:
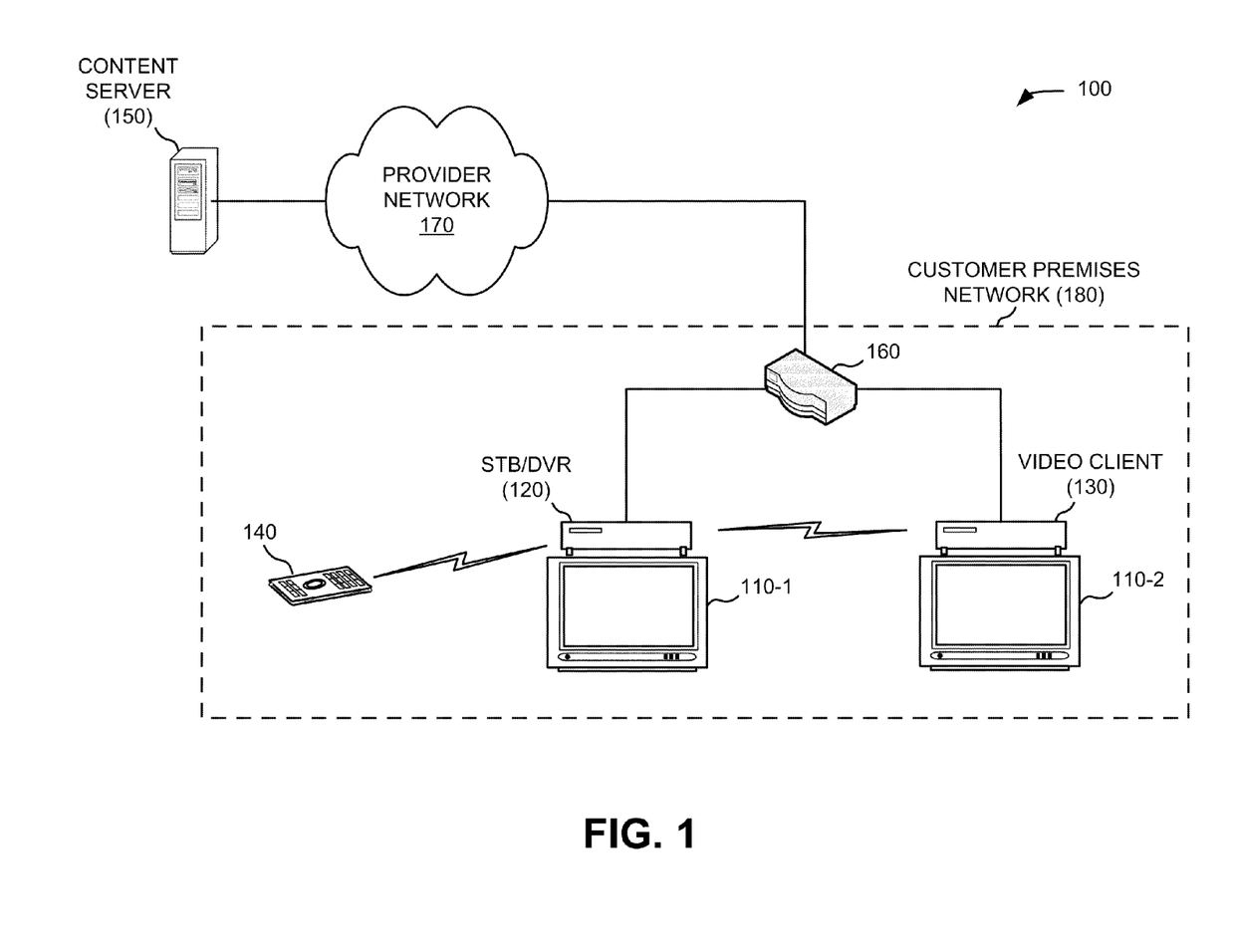
FIG. 1 depicts a diagram of an exemplary network in which systems and methods described herein may be implemented.

FIG. 1 is a diagram of an exemplary network 100 in which systems and methods described herein may be implemented. As illustrated, network 100 may include multiple video display devices 110-1 and 110-2 (herein referred to collectively as "video display devices 110" and generically as "video display device 110"), a set-top box/digital video recorder (STB/DVR) 120, a video client 130, a remote control 140, a content server 150, a local gateway 160, a provider network 170, and a customer premises network 180. Components of network 100 may interconnect via wired and/or wireless connections. Two video display devices, one STB/DVR, one video client, one remote control, one content server, one gateway, one provider network, and one customer premises network have been illustrated in FIG. 1 for simplicity. In practice, there may be more video display devices, STB/DVRs, video clients, remote controls, content servers, gateways, networks, and/or customer premises network. Also, in some instances, one or more of the components of network 100 may perform one or more functions described as being performed by another one or more of the components of network 100.

Video display device 110 may include any digital or analog display that is capable of displaying television programming, content provided by STB/DVR 120, and/or content provided by other devices (e.g., a digital video disk (DVD) player, a video camera, an Internet connection, etc., not shown) connected to video display device 110. Video display device 110 may include technologies, such as cathode ray tube (CRT) displays, liquid crystal displays (LCDs), light-emitting diode (LED) displays, plasma displays, etc.

STB/DVR 120 may include a device for selecting, obtaining (e.g., from content server 150), and/or recording content that may be shown or played on video display device 110 or another device. STB/DVR 120 may allow a user to alter the programming provided to video display device 110 based on a signal (e.g., a channel up or channel down signal) from remote control 140. STB/DVR 120 may receive a television (or other programming) signal from content server 150 (e.g, via network 170 and gateway 160), may convert the signal to a form usable by video display device 110, and may transmit the signal to video display device 110 for display. STB/DVR 120 may include a fixed number of tuners (e.g., two radio frequency (RF) tuners) to receive television signals from content server 150. STB/DVR 120 may also record video in a digital format to a disk drive or other memory medium within STB/DVR 120. In one exemplary implementation, STB/DVR 120 may be incorporated directly within video display device 110. STB/DVR 120 may communicate with video client 130 via customer premises network 180.

Video client 130 may include a device for selecting and/or obtaining (e.g., from content server 150) content that may be shown or played on video display device 110 or another device. Video client 130 may include features similar to that of STB/DVR 120. In one implementation, video client 130 may not include the ability to record video in a digital format. Examples of video client 140 may include a set-top box, a computer, a cable card, and a portable electronic device. In one implementation, user video client 130 may include a device (e.g., an Internet Protocol (IP)-based device) that is capable of streaming content to STB/DVR 120 via customer premises network 180.

Remote control 140 may include a device that allows a user to control programming and/or content displayed on one or more of video display devices 110 via interaction with STB/DVR 120 and/or video client 130. Remote control 140 may transmit signals, such as, for example, infrared signals, to a signal receiver associated with video display devices 110, STB/DVR 120, and/or video client 130.

Content server 150 may include one or more server entities, or other types of computation or communication devices, that gather, process, search, and/or provide information in a manner described herein. In one implementation, content server 150 may include one or more devices for providing content/information to video display devices 110, STB/DVR 120, and/or video client 130. Content server 150 may include a server device for a subscription television (and other content) service (e.g., cable, satellite, or another subscription programming service). Examples of content server 150 may include a headend device that provides broadcast television programs and/or PPV events, a video-on-demand (VOD) device or other device that provides multimedia content upon request, and a program guide information server that provides information related to multimedia content available to customer premises network 180.

Content server 150 may provide content to STB/DVR 120 and/or video client 130 (e.g., for viewing on video display devices 110). Content server 150 may receive content, may filter content (e.g., may review and approve content from a legal perspective (e.g., a check against potential copyright issues)), and may transform the filtered content into a TV compatible format (e.g., a TV compatible video CODEC (MPEG 2 or MPEG 4)) for use by STB/DVR 120 and/or video client 130. Content server 150 may provide content to STB/DVR 120 and/or video client 130 in various formats, such as Quadrature Amplitude Modulation ("QAM") for cable systems, Vestigial Side-Band ("VSB") for terrestrial broadcast systems, or Quadrature Phase Shift Keying ("QPSK") modulation for satellite Direct Broadcasting Service systems ("DBS").

Gateway 160 may include a network device that provides an interface from network 170 to STB/DVR 120, video client 130, and/or other network connectivity devices (not shown). Gateway 160 may include one of a number of possible gateway devices, including a satellite antenna and receiver, a coaxial cable connection, an ONT, or a broadband access for Internet Protocol TV (IPTV). For example, when telecommunication services are provided to the customer's premises via an optical fiber, gateway 160 may include an optical network terminal (ONT) that connects to the optical fiber. The ONT may convert between signals appropriate for video display devices 110 and signals appropriate for transmission over optical fiber. For example, the ONT may include a coaxial cable connection that leads to video display device 110-1 or STB/DVR 120. The ONT may also include an Ethernet output port that connects to a personal computer or a VoIP telephone and/or a standard telephone port for connecting to a standard telephone.

Network 170 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or a combination of networks. Although shown as a single element in FIG. 1, network 170 may include a number of separate networks that function to provide services to devices, such as video display devices 110, within customer premises network 180. In one implementation, network 170 may terminate at the customer's premises via an optical communication link, such as an optical fiber provided to the customer's premises. In another possible implementation, network 170 may terminate at the customer's premises via a coaxial cable. In still another implementation, network 170 may terminate at the customer's premises via a wireless (e.g., satellite) connection.

Customer premises network 180 may include video display devices 110, STB/DVR 120, video client 130, remote control 140, and local gateway 160. Devices within customer premises network 180 may be connected via wired (e.g., coaxial cable) or wireless connections (e.g., using network devices such as those available under the IEEE 802.11 wireless LAN standards). Customer premises network 180 may also be referred to herein as a home network or a home computer network.

In implementations described herein, when the number of simultaneous recording requests exceeds the number of tuners available on STB/DVR 120, STB/DVR 120 may initiate a video streaming session (e.g., an IP streaming session) between video client 130 and STB/DVR 120. STB/DVR 120 may provide recording parameters (e.g., channel information, recording time, program code, etc.) to video client 130 for the video streaming. Video client 130 may tune into the respective channel and start streaming the video to the STB/DVR 120 through a requested protocol (e.g., IP protocol). STB/DVR 120 can receive and convert the streaming video to a required DVR format. The converted video may be stored in a memory of STB/DVR 120 for later selection and retrieval.

Figure 2:
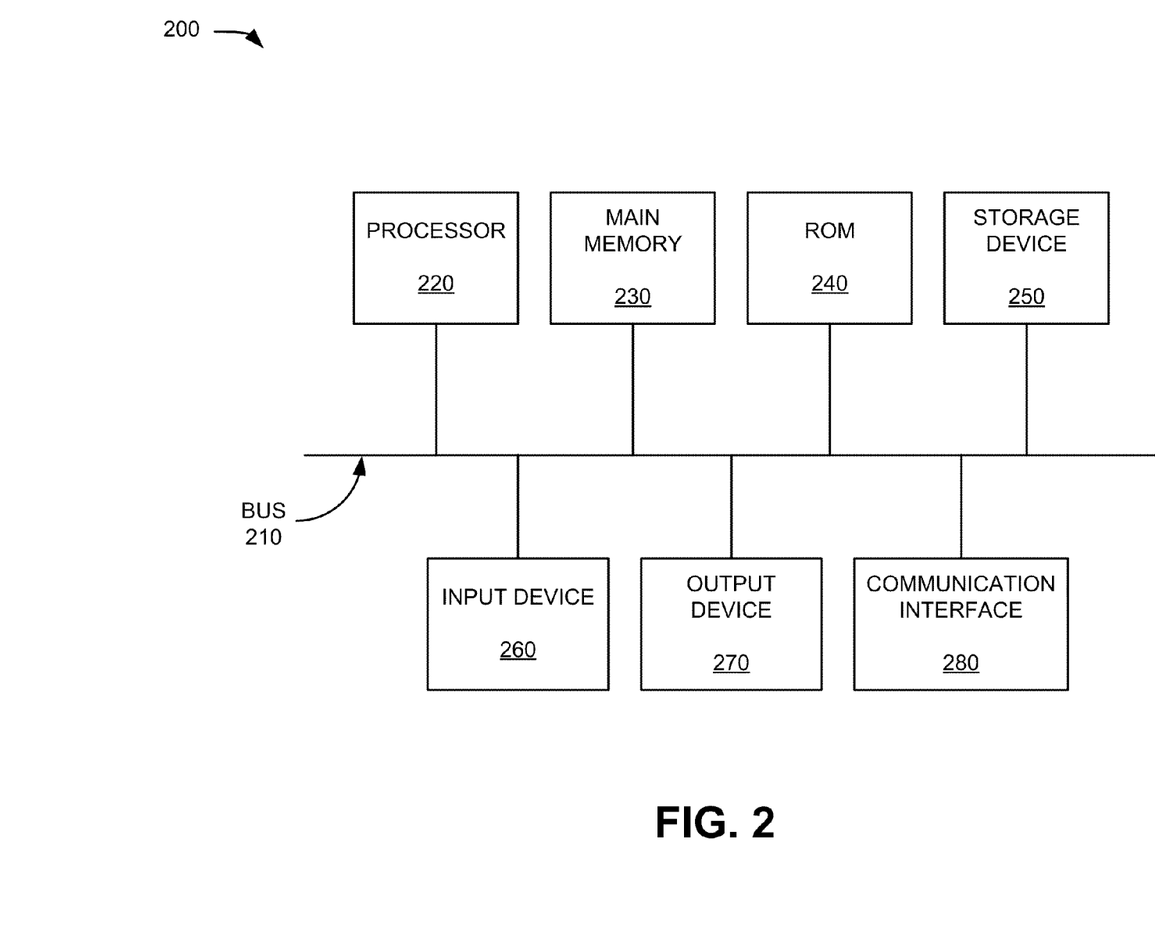
FIG. 2 illustrates exemplary components of a STB/DVR and/or a STB of the network depicted in FIG. 1.

FIG. 2 is an exemplary diagram of a device 200 that may correspond to any of STB/DVR 120, video client 130 and/or content server 150. As illustrated, device 200 may include a bus 210, a processor 220, a main memory 230, a read-only memory (ROM) 240, a storage device 250, an input device 260, an output device 270, and/or a communication interface 280. Bus 210 may include a path that permits communication among the components of device 200.

Processor 220 may include a processor, microprocessor, or a type of processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and/or instructions for use by processor 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, remote control 140, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as provider network 170 and/or customer premises network 180.

As described herein, device 200 may perform certain operations in response to processor 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, additional, different and/or differently-arranged components than depicted in FIG. 2. In still other implementations, one or more components of device 200 may perform one or more other tasks described as being performed by one or more other components of device 200.

Figure 3:
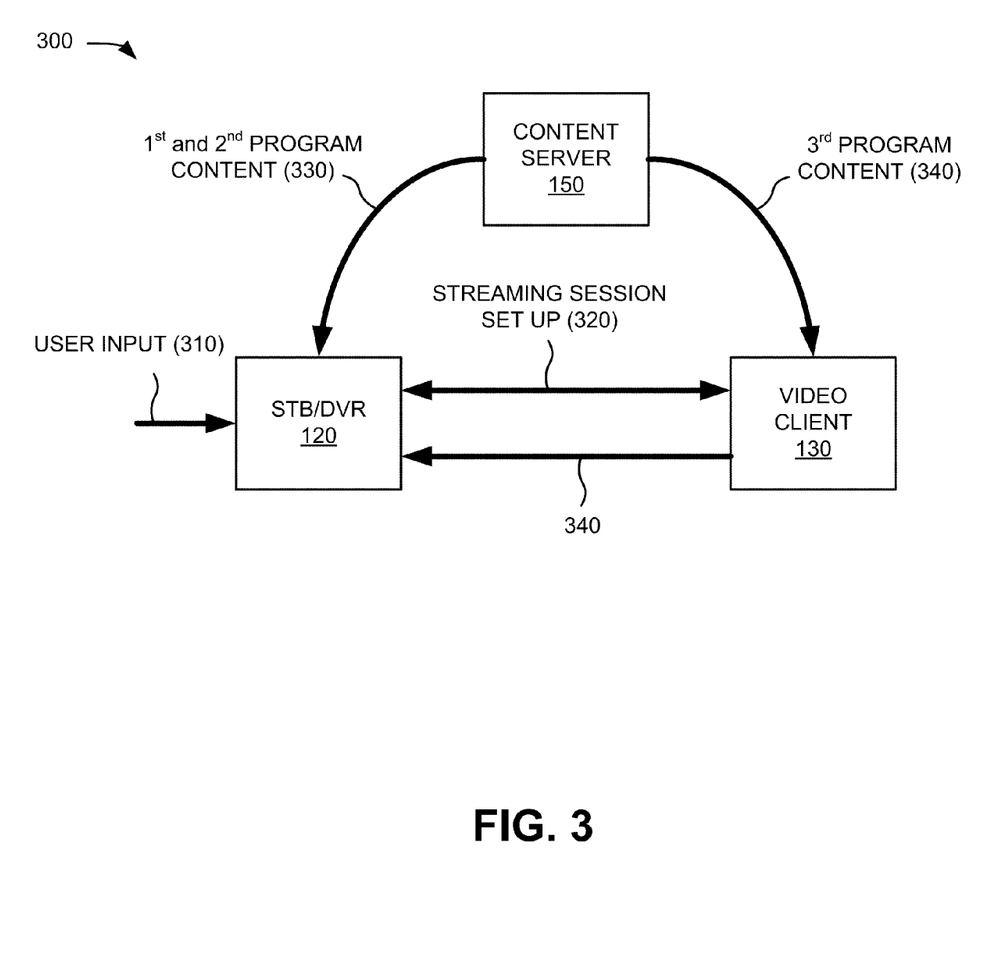
FIG. 3 depicts a diagram of an exemplary portion of the network illustrated in FIG. 1.

FIG. 3 depicts a diagram of an exemplary portion 300 of network 100. As illustrated, exemplary network portion 300 may include STB/DVR 120, video client 130, and content server 150. STB/DVR 120, video client 130, and content server 150 may include the features described above in connection with, for example, FIG. 1.

As further shown in FIG. 3, STB/DVR 120 may receive user input that includes instructions for a number of simultaneous or overlapping video recordings that exceeds the number of physical tuners available on STB/DVR 120, as indicated by reference number 310. User input may be provided incrementally (e.g., via entries using remote control 140 for each set of recording instructions) or as a single input (e.g., downloaded to STB/DVR 120 from another device).

Assume for the description herein, that STB/DVR 120 includes two tuners and that user input 310 includes instructions to record three video programs during the same half-hour period. STB/DVR 120 may receive and record the first and second of the three programs using tuners available in STB/DVR 120. To support recording of the third video program, STB/DVR 120 and video client 130 may establish a streaming session, as indicated by reference 320. For example, STB/DVR 120 may initiate a three-way handshake sequence to establish an IP video streaming session between STB/DVR 120 and video client 130. STB/DVR 120 may also provide recording parameters (e.g., channel information, recording time, program code, etc.) for the third video program.

At the time(s) designated by the user (e.g., via user input 310), STB/DVR 120 may tune to and receive the first and second program content from content server 150, as indicated by reference 330. Similarly, video client 130 may tune to and receive the third program content from content server 150, as indicated by reference 340. Video client 130 may then stream the third program content to STB/DVR 120 (using customer premises network 180).

Although FIG. 3 show exemplary components of network portion 300, in other implementations, network portion 300 may contain fewer, additional, different and/or differently-arranged components than depicted in FIG. 3. In still other implementations, one or more components of network portion 300 may perform one or more other tasks described as being performed by one or more other components of network portion 300.

Figure 4:
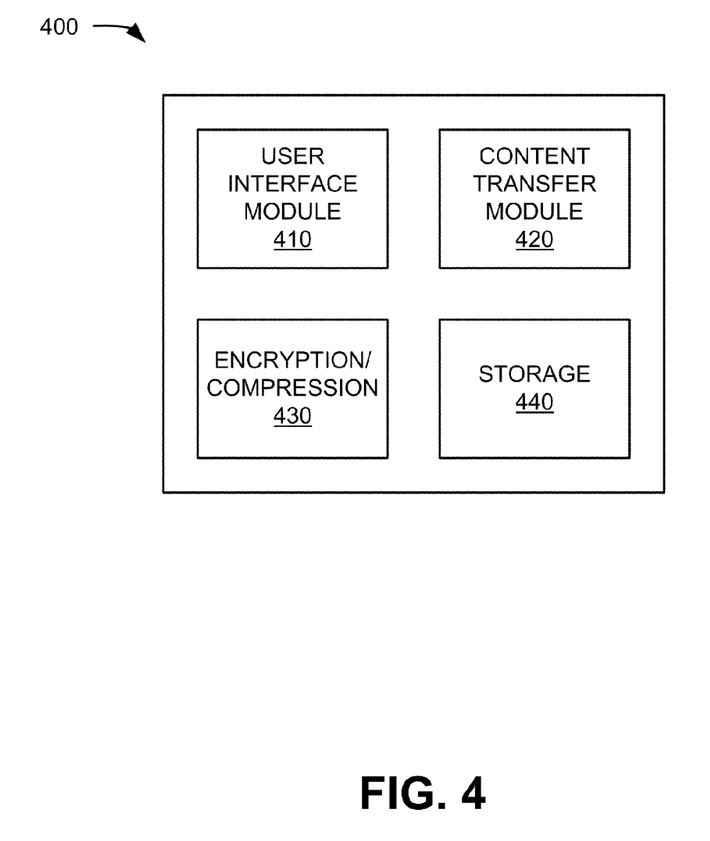
FIG. 4 illustrates a diagram of exemplary functional components of the content server of the network depicted in FIG. 1.

FIG. 4 illustrates a diagram of exemplary functional components of STB/DVR 120. As illustrated, STB/DVR 120 may include user interface module 410, content transfer module 420, encryption/compression module 430, and storage 440. The functions described in FIG. 4 may be performed by one or more of the exemplary components of device 200 depicted in FIG. 2.

User interface module 410 may include hardware or a combination of hardware and software (e.g., processor 220) that enables STB/DVR 120 to generate user interfaces. User interface module 410 may solicit and receive user input regarding recording operations by STB/DVR 120. In one example, user interface module 410 may generate user interface 500 described below in connection with FIG. 5.

Content transfer module 420 may include hardware or a combination of hardware and software (e.g., processor 220) that identifies tuner availability from a remote video client (e.g., one or more video clients 130), receives (e.g., from content server 150 and/or video client 130) program content 330, and provides program content 330 to storage 440. For example, content transfer module 420 may track how many physical tuners are available within the devices of customer premises network 180 and request availability of one or more remote tuners to support a user request for recording a program (i.e., a request that may exceed the tuner capacity of STB/DVR 120). Content transfer module 420 may simultaneously receive and store content from content server 150 (e.g., via RF tuners within STB/DVR 120) and from video client 130 (e.g., via a streaming video). In an exemplary implementation, content transfer module 420 may receive some program content (e.g., first and/or second program content 330) as an RF signal from content server 150, while simultaneously receiving other program content (e.g., third program content 340) as an IP video stream from video client 130. Content transfer module 420 may also receive a user request to view content from STB/DVR 120, and may retrieve the stored program content from storage 430 based on the user's request.

Encryption/compression module 430 may include hardware or a combination of hardware and software (e.g., processor 220) that encrypt/decrypt digital data before storing in storage 440. For example, encryption/compression module 430 may include software programs that may modify video data to be stored for purposes of copyright protection. In some implementations, where required, encryption/compression module 430 may also compress/decompress video signals before storing/retrieving them from storage 440. For example, encryption/compression module 430 may apply MPEG digital compression. Where video signals are received in analog format the analog signals may be decoded, digitized and digitally compressed prior to storage. Upon playback (e.g., retrieval from hard disk memory), the compressed MPEG streams may be decompressed, re-encoded and converted by means of a digital-to-analog converter ("DAC") into standard television signals for display on standard television sets and/or audio entertainment systems.

Storage 440 may include a storage device (e.g., main memory 230, ROM 240, storage device 250, etc.) that may store content (e.g., program content 330/340) associated with the STB/DVR 120. In some implementations, storage 440 may also include indexing for the stored content.

Although FIG. 4 shows exemplary functional components of STB/DVR 120, in other implementations, STB/DVR 120 may contain fewer, additional, different and/or differently-arranged functional components than depicted in FIG. 4. In still other implementations, one or more functional components of STB/DVR 120 may perform one or more other tasks described as being performed by one or more other functional components of STB/DVR 120.

Figure 5:
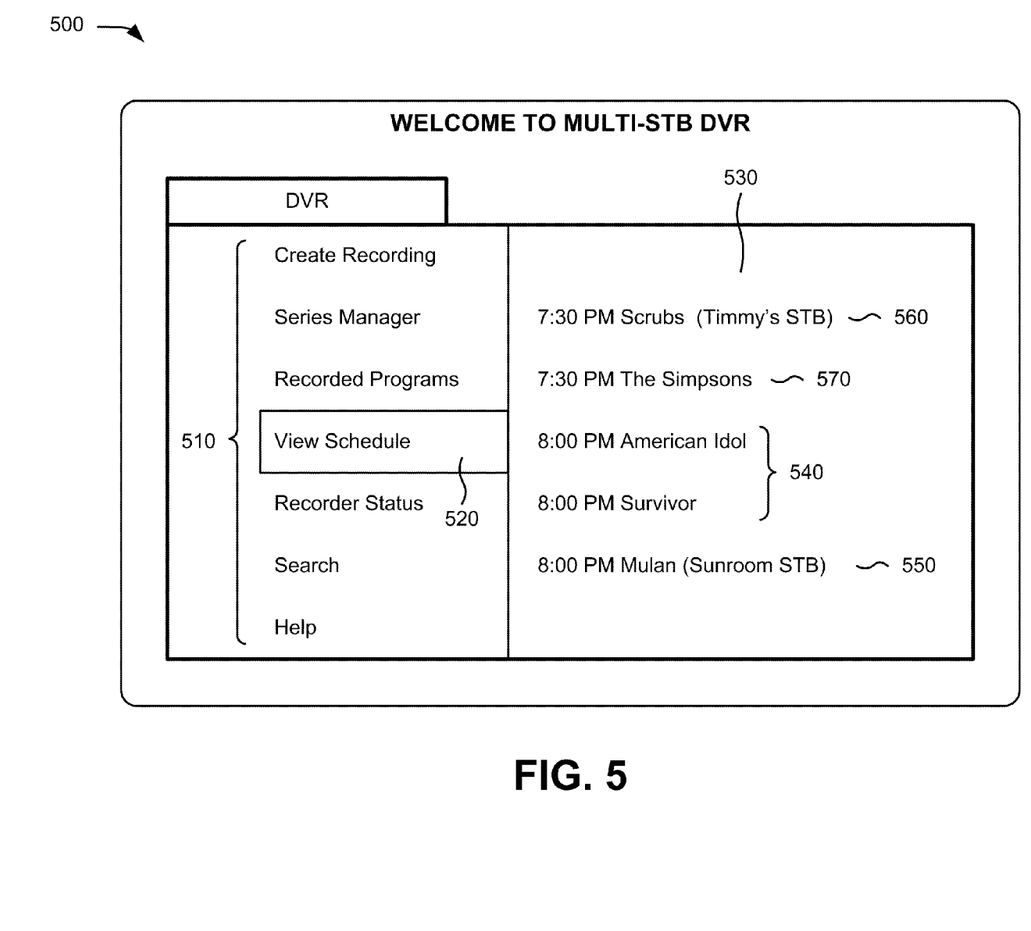
FIG. 5 illustrates a diagram of an exemplary view schedule user interface capable of being generated by the STB/DVR of the network depicted in FIG. 1.

FIG. 5 depicts a diagram of an exemplary view schedule user interface 500 capable of being generated by STB/DVR 120. User interface 500 may include a graphical user interface (GUI) or a non-graphical user interface, such as a text-based interface. User interface 500 may provide information to users via a customized interface (e.g., a proprietary interface) and/or other types of interfaces (e.g., a browser-based interface). User interface 500 may receive user inputs via one or more input devices (e.g., input device 260), may be user-configurable (e.g., a user may change the size of the user interfaces, information displayed in the user interfaces, color schemes used by the user interfaces, positions of text, images, icons, windows, etc., in the user interfaces, etc.). User interface 500 may be displayed to a user via one or more output devices (e.g., output device 270).

As illustrated, view schedule user interface 500 may include a main menu 510, a view schedule entry 520, a scheduling section 530, programs 540 to be recorded by STB/DVR 120, and/or a program 550 to be recorded by video client 130. View schedule user interface 500 may be displayed to a user of STB/DVR 120. Information associated with view schedule user interface 500 may be selected by a user of STB/DVR 120 (e.g., via input device 260 and/or output device 270 (e.g., a touch-screen display)).

Main menu 510 may include a variety of selectable information associated with STB/DVR 120. For example, main menu 510 may provide a create recording entry, a series manager entry, a recorded programs entry, view schedule entry 520, a recorder status entry, a search entry, and/or a help entry. The create recording entry, if selected, may provide information associated with creation of a recording via STB/DVR 120 and/or video client 130. The series manager entry, if selected, may provide information associated with managing recordation of a series (e.g., a TV series) via STB/DVR 120 and/or video client 130. The recorded programs entry, if selected, may provide information associated with programs stored on STB/DVR 120. View schedule entry 520, when selected (e.g., as depicted in FIG. 5), may provide information associated with a schedule of television programs to be recorded by STB/DVR 120 and/or video client 130, such as the information depicted by view schedule user interface 500. The recorder status entry, if selected, may provide information associated with a capacity of STB/DVR 120. The search entry, if selected, may provide information that enables a user of STB/DVR 120 to search for content stored on STB/DVR 120. The help entry, if selected, may provide help information associated with STB/DVR 120.

Scheduling section 530 may provide a variety of information associated with programs to be recorded on STB/DVR 120 using STB/DVR 120 or video client 130. For example, scheduling section 530 may provide names of programs to be recorded from STB/DVR 120 (e.g., "Scrubs," "The Simpsons," "American Idol," and "Survivor"), and names of programs to be recorded from a video client 130 (e.g., "Mulan"). As further shown in FIG. 5, scheduling section 530 may indicate that three programs (e.g., programs 540 and program 550) are to be recorded simultaneously at 8:00 PM. Program 550 may also include an indication that DVR/STB 120 may access program 550 via a virtual turner (e.g., a video client 130 identified as "Sunroom STB"). Such an arrangement may appeal to users who wish to record more than two programs simultaneously. By enabling users of STB/DVR 120 to receive content, the users may be able to simultaneously record more than two programs (e.g., "Mulan," "Survivor," and "American Idol").

FIG. 5 also indicates that a user of STB/DVR 120 may request that one or more programs be simultaneously recorded from video client 130 even if other tuners of STB/DVR 120 are available for use. In FIG. 5, scheduling section 530 may indicate that two programs (e.g., programs 560 and program 570) are to be recorded simultaneously at 7:30 PM. Program 560 may also include an indication that DVR/STB 120 may access program 560 via a virtual turner (e.g., a video client 130 identified as "Timmy's STB"). Thus, a user may arrange to leave a tuner of STB/DVR available for other uses during a particular time period while still conducting simultaneous recordings.

Although view schedule user interface 500 depicts a variety of information, in other implementations, view schedule user interface 500 may depict more, less, different and/or differently-arranged information than depicted in FIG. 5.

Figure 6:
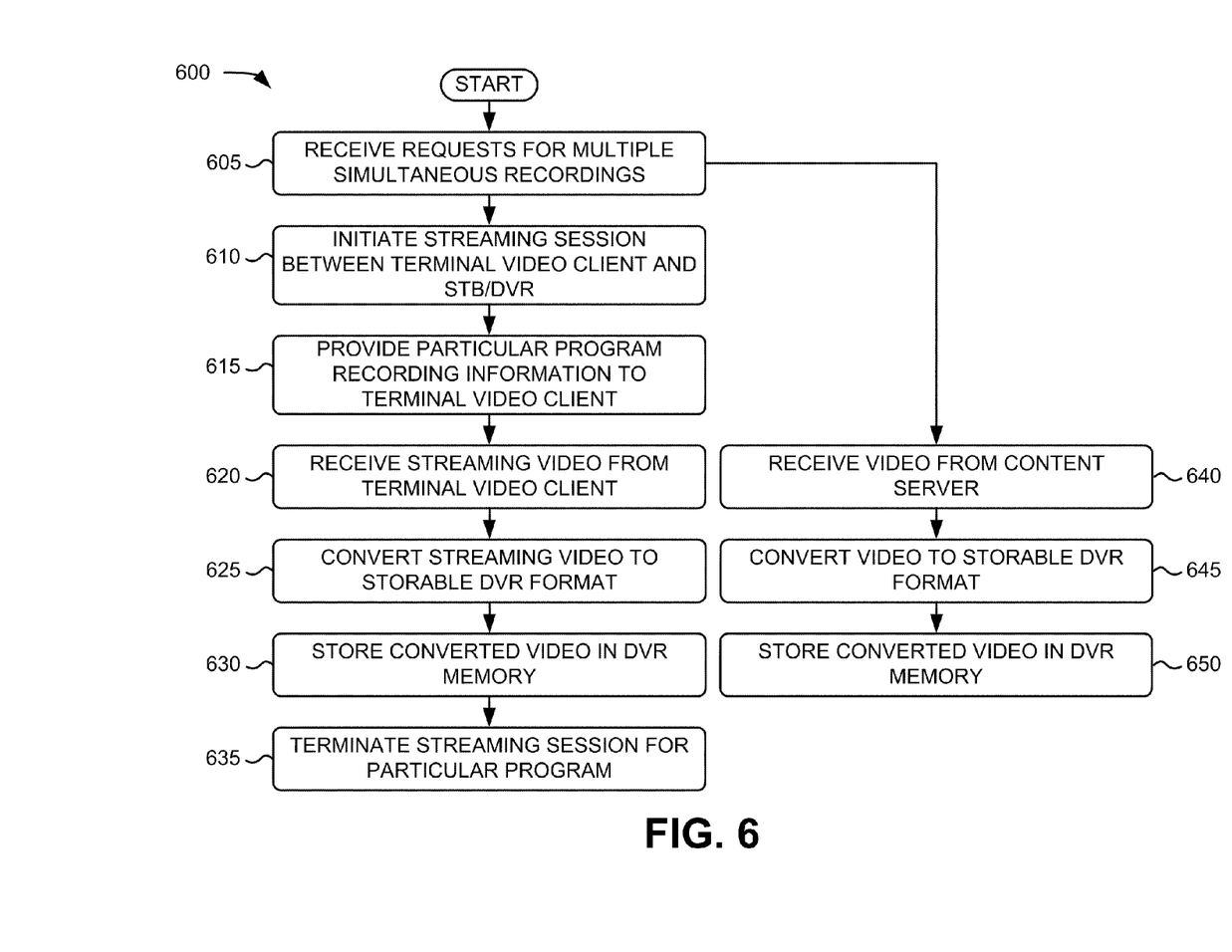
FIG. 6 illustrates a flow chart of an exemplary process according to implementations described herein.

FIG. 6 illustrates a flow chart of an exemplary process 600 for providing enhanced simultaneous recording DVR service, according to implementations described herein. In one implementation, process 600 may be performed by STB/DVR 120. In another implementation, some or all of process 600 may be performed by another device or a group of devices, including or excluding STB/DVR 120.

As illustrated in FIG. 6, process 600 may begin with receiving requests for more than two simultaneous recordings (block 605). For example, in implementations described above in connection with FIG. 3, STB/DVR 120 may receive user input (e.g., via remote control 140) that includes instructions for recording a number of simultaneous or overlapping video recordings that exceeds the number of physical tuners available on STB/DVR 120. In one example, STB/DVR 120 may include two physical RF tuners, and the requests may include three or more simultaneous recordings. Recording requests that exceed the number of available physical tuners may be handled using video streaming from tuners of other video clients 130 within customer premises network 180. In another example, a user of STB/DVR 120 may request that one or more programs be simultaneously recorded through video client 130 even if the two tuners of STB/DVR 120 are available for use.

A streaming session between a video client and the DVR/STB may be initiated (block 610). For example, in implementations described above in connection with FIG. 3, STB/DVR 120 and video client 130 may establish a streaming session, such as an IP video streaming session. In implementations where more than one video client 130 will be used to support the simultaneous recordings, STB/DVR 120 may establish a separate streaming session with each video client 130.

Particular program recording information may be provided to the video client (block 615). For example, STB/DVR 120 may provide recording parameters (e.g., channel information, recording start/stop time, program code, etc.) for any video program that will be streamed from video client 130. In implementations where more than one video client 130 will be used to support the simultaneous recordings, STB/DVR 120 may provide recording parameters for programs assigned to be streamed from each respective video client 130.

Streaming video may be received from the video client (block 620). For example, in implementations described above in connection with FIG. 3, video client 130 may tune to and receive the program content from content server 150. The program content may be based on the recording parameters previously provided by STB/DVR 120. Video client 130 may then convert the program content into a packet format for IP streaming and stream the program content to STB/DVR 120 (using, for example, customer premises network 180).

The streaming video may be converted to a storable DVR format (block 625). For example, STB/DVR 120 (e.g., encryption/compression module 430) may perform encryption and/or compression processing to facilitate copyright protections and to conserve storage space.

The converted video may be stored in the DVR memory (block 630). For example, STB/DVR 120 may store the encrypted and/or compressed video in memory (e.g., main memory 230 or storage device 250). The video may be indexed with other stored programming for later retrieval/viewing by a user of STB/DVR 120.

The streaming session for the particular program may be terminated (block 635). For example, STB/DVR 120 may terminate the video streaming session with video client 130 using appropriate network protocols. In another implementation, video client 130 may initiate terminating the video streaming session based on completion of the time period provided in the recording parameter previously provided by STB/DVR 120.

Returning to block 605 of FIG. 6, recording requests that can be supported by available tuners in STB/DVR 120 may be conducted in parallel with the above-described video streaming. The video content may be received from a content server (block 640). For example, in the implementation where STB/DVR 120 includes two available tuners, STB/DVR 120 may receive program content (e.g., from content server 150) for two programs simultaneously using the two available tuners. The video may be converted to a storable DVR format (block 645). Similar to processing for streamed video, the video content received directly from content server 150 at STB/DVR 120 may be converted to a storable DVR format. For example, STB/DVR 120 (e.g., encryption/compression module 430) may perform encryption and/or compression processing to facilitate copyright protections and to conserve storage space in STB/DVR 120. The converted video may be stored in the DVR memory (block 650). For example, STB/DVR 120 may store the encrypted and/or compressed video in memory (e.g., main memory 230 or storage device 250). The video may be indexed with other stored programming for later retrieval/viewing by a user of STB/DVR 120.

Systems and/or methods described herein may receive a request, from a user to a STB/DVR, to record content from a content server outside a home computer network. The systems and/or methods may identify an available tuner in a remote video client and provide recording information to the video client to support the user request. The video client may retrieve the content from the content server in native format (e.g., via an RF signal) and initiate a streaming video session with the STB/DVR within the home computer network. The video client may convert the content from the content server into a streaming video format and send the content in a streaming video format to the STB/DVR. The STB/DVR may then store the content for later retrieval by the user.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 6, the order of the blocks may be modified in other implementations. Further, non-dependent blocks may be performed in parallel.

It will be apparent that aspects, as described herein, may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, the method comprising:
   receiving, at the computing device, a request to simultaneously record two or more programs from a content server;
   determining, by the computing device, that the computing device has a quantity of tuners available to simultaneously record the two or more programs based on the request;
   receiving, at the computing device and after determining that the computing device has the quantity of available tuners, another request to record a first program, of the two or more programs, through a video client,
      the computing device not recording the first program, of the two or more programs, at any of the quantity of tuners determined to be available to simultaneously record the two or more programs;
   initiating, by the computing device, a streaming video session between the computing device and the video client;
   providing, by the computing device to the video client, recording parameters for the first program;
   receiving, by the computing device, a second program of the two or more programs;
   receiving, by the computing device via the streaming video session, a video stream from the video client, the video stream including the first program, at the same time that the computing device receives the second program;
   converting, by the computing device, the received video stream to a storable digital video recorder format using at least one of encryption or compression;
   recording, by the computing device, the second program; and
   recording, by the computing device, the converted first program received, via the streaming video session, at the same time that the computing device records the second program.

2. The computing device-implemented method of claim 1, where the request is to simultaneously record three programs, the method further comprising:
   receiving, from the content server, the third program; and
   recording, by the computing device, the third program based on the request.

3. The computing device-implemented method of claim 1, where the streaming video session is conducted over a network within a customer premises.

4. The computing device-implemented method of claim 1, where the streaming video session uses Internet protocol.

5. The computing device-implemented method of claim 1, further comprising:
   indexing the converted first program and the second program.

6. The computing device-implemented method of claim 1, where the computing device comprises a set-top box/digital video recorder (STB/DVR) and where the video client comprises a set-top box.

7. The computing device-implemented method of claim 1, where the content server comprises a headend for a subscription television service.

8. A device comprising:
a memory to store digital video content and a plurality of instructions;
a processor to execute the plurality of instructions in the memory to:
receive a request to record two or more programs from a content server,
determine that the device has a quantity of tuners available to simultaneously record the two or more programs based on the request;
receive, after determining that the device has the quantity of available tuners, another request to record a first program, of the two or more programs, through a video client,
the processor not recording the first program, of the two or more programs, at any of the quantity of tuners determined to be available to simultaneously record the two or more programs;
initiate a streaming session between the device and the video client,
provide, to the video client, recording information for the first program,
receive a second program of the two or more programs,
receive, via the streaming session and from the video client, a video stream including the first program at the same time that the processor receives the second program,
convert the received video stream to a storable digital video recorder format using at least one of encryption or compression,
record, in the memory, the second program, and
record, in the memory, the converted first program at the same time that the processor records the second program.

9. The device of claim 8, where the processor is further to execute the plurality of instructions in the memory to:
transmit information to the video client to terminate the video streaming session.

10. The device of claim 8, where the request is to simultaneously record three programs and the processor is further to execute the plurality of instructions in the memory to:
receive, from the content server, the third program; and
record the third program.

11. The device of claim 8, where the streaming video session uses Internet protocol.

12. The device of claim 8, where the content server comprises a headend for a subscription television service.

13. The device of claim 8, where the device comprises a set-top box/digital video recorder (STB/DVR).

14. The device of claim 8, where the device and the video client are connected within a home network.

15. The device of claim 8, where the processor is further to execute the plurality of instructions in the memory to:
apply a compression process to the video stream.

16. A non-transitory computer-readable storage medium containing instructions, the instructions comprising:
one or more instructions, executable by at least one processor, to cause the at least one processor to receive a request to simultaneously record two or more programs from a content server;
one or more instructions, executable by the at least one processor, to cause the at least one processor to determine that the at least one processor has a quantity of tuners available to simultaneously record the two or more programs based on the request;
one or more instructions, executable by the at least one processor, to cause the at least one processor to receive, after determining that the at least one processor has the quantity of available tuners, another request to record a first program, of the two or more programs, through a video client,
the at least one processor not recording the first program, of the two or more programs, at any of the quantity of tuners determined to be available to simultaneously record the two or more programs;
one or more instructions, executable by the at least one processor, to cause the at least one processor to initiate a streaming video session with the video client;
one or more instructions, executable by the at least one processor, to cause the at least one processor to provide, to the video client, recording parameters for the first program;
one or more instructions, executable by the at least one processor, to cause the at least one processor to receive a second program of the two or more programs;
one or more instructions, executable by the at least one processor, to cause the at least one processor to receive a video stream from the video client, the video stream including the first program, at the same time that the processor receives the second program;
one or more instructions, executable by the at least one processor, to cause the at least one processor to convert the received video stream to a storable digital video recorder format using at least one of encryption or compression;
one or more instructions, executable by the at least one processor, to cause the at least one processor to record the second program; and
one or more instructions, executable by the at least one processor, to cause the at least one processor to record the converted first program at the same time that the at least one processor records the second program.

17. The computer-readable medium of claim 16, where the request is for simultaneously recording three programs, the instructions further comprising:
one or more instructions to receive a third program; and
one or more instructions to record the third program.

18. The computer-readable medium of claim 17, where the third program is recorded simultaneously with the first program and the second program.

19. The device of claim 8, where the processor is further to execute instructions in the memory to:
index the received video stream.

20. The computer-readable medium of claim 16, where the one or more instructions to receive the video stream from the video client include:
one or more instructions to index the received video stream.

* * * * *